(12) United States Patent
Higuchi et al.

(10) Patent No.: US 8,054,792 B2
(45) Date of Patent: Nov. 8, 2011

(54) TRANSMITTING APPARATUS, RECEIVING APPARATUS, AND PAGING INFORMATION RECEPTION METHOD

(75) Inventors: Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 340 days.

(21) Appl. No.: 12/299,152

(22) PCT Filed: Apr. 19, 2007

(86) PCT No.: PCT/JP2007/058540
§ 371 (c)(1),
(2), (4) Date: Feb. 23, 2009

(87) PCT Pub. No.: WO2007/129541
PCT Pub. Date: Nov. 15, 2007

(65) Prior Publication Data
US 2009/0219861 A1 Sep. 3, 2009

(30) Foreign Application Priority Data
May 1, 2006 (JP) ................................. 2006-127995

(51) Int. Cl.
*H04W 4/00* (2009.01)
(52) U.S. Cl. ...................................................... 370/329
(58) Field of Classification Search .................. 370/342, 370/335, 329; 455/574, 458, 515, 434
See application file for complete search history.

(56) References Cited

U.S. PATENT DOCUMENTS

| | | | | |
|---|---|---|---|---|
| 4,644,351 A | * | 2/1987 | Zabarsky et al. | 340/7.21 |
| 6,650,912 B2 | * | 11/2003 | Chen et al. | 455/574 |
| 6,999,753 B2 | * | 2/2006 | Beckmann et al. | 455/412.2 |
| 2004/0176112 A1 | | 9/2004 | Beckmann et al. | |

FOREIGN PATENT DOCUMENTS

| | | |
|---|---|---|
| JP | 05-114883 A | 5/1993 |
| JP | 2004-221759 A | 8/2004 |
| JP | 2004-538731 A | 12/2004 |
| JP | 2006-033819 A | 2/2006 |
| JP | 2006-033820 A | 2/2006 |
| JP | 2006-509382 A | 3/2006 |

OTHER PUBLICATIONS

Keiji Tachikawa, "W-CDMA Mobile Communication System," published by Maruzen K.K., pp. 255-256, Jun. 24, 2001, with English translation, 9 pages.
International Search Report issued in PCT/JP2007/058540, mailed on Jun. 5, 2007, with translation, 5 pages.
Written Opinion issued in PCT/JP2007/058540, mailed on Jun. 5, 2007, 3 pages.
Office Action in Taiwanese with Patent Application No. 096114594 mailed Oct. 22, 2010, with English translation thereof (7 pages).
Japanese Office Action for Application No. 2009-191397, mailed on Jun. 21, 2011 (4 pages).
NTT Docomo et al, "Paging Channel Structure for E-UTRA Downlink", R2-060837, 3GPP TSG RAN WG1 and WG2 Joint Meeting, Athens, Greece, Mar. 27-31, 2006.
Patent Abstracts of Japan for Japanese Publication No. 05-114883, publication date May 7, 1993 (1 page).

\* cited by examiner

*Primary Examiner* — Ricky Ngo
*Assistant Examiner* — Chandrahas Patel
(74) *Attorney, Agent, or Firm* — Osha• Liang LLP

(57) ABSTRACT

A disclosed transmitting apparatus includes a paging indicator information generating unit generating paging indicator information including a group ID of users who are to receive a paging channel and information indicating a radio resource in which the paging channel is transmitted; and a multiplexing unit multiplexing the paging indicator information.

15 Claims, 18 Drawing Sheets

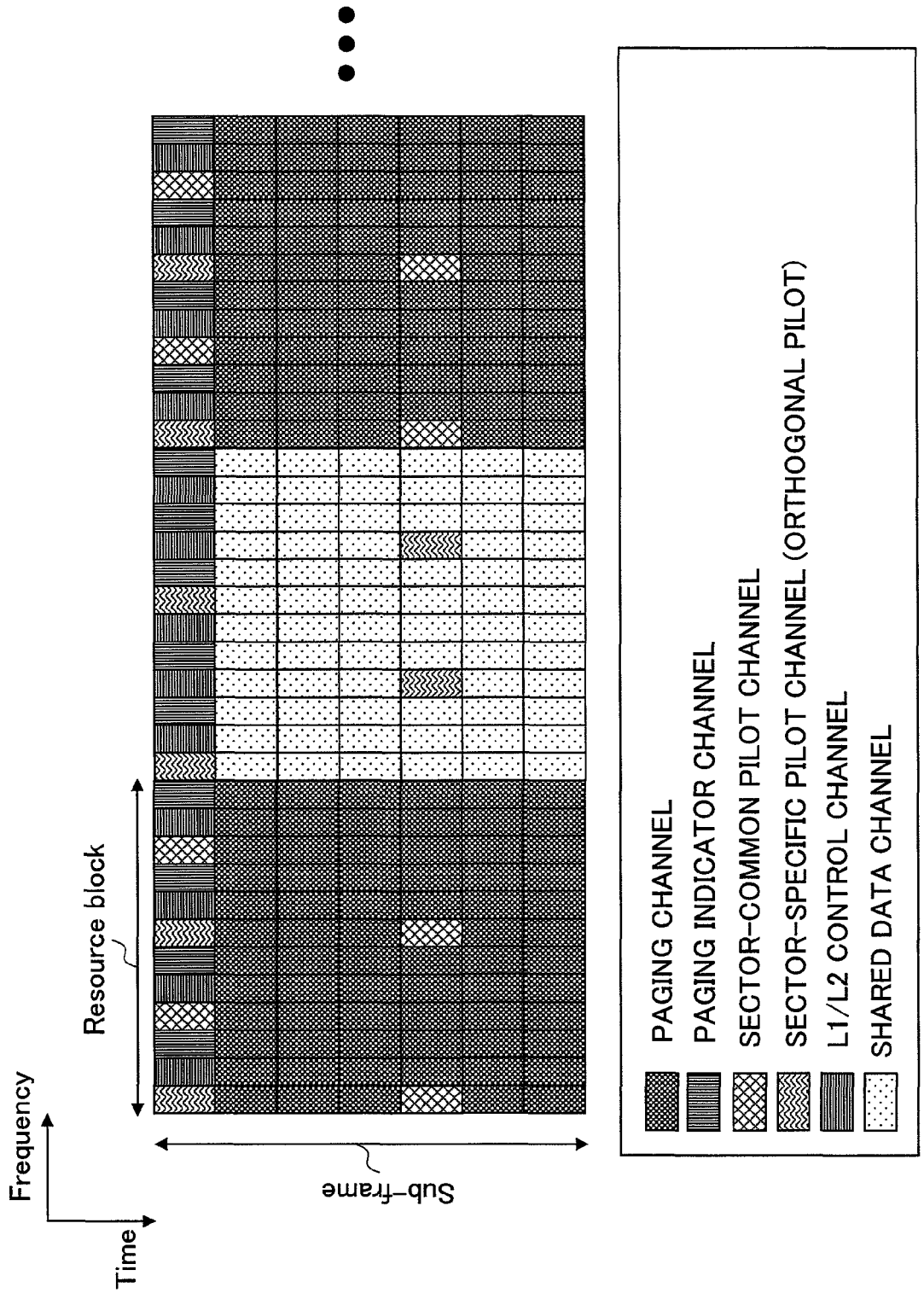

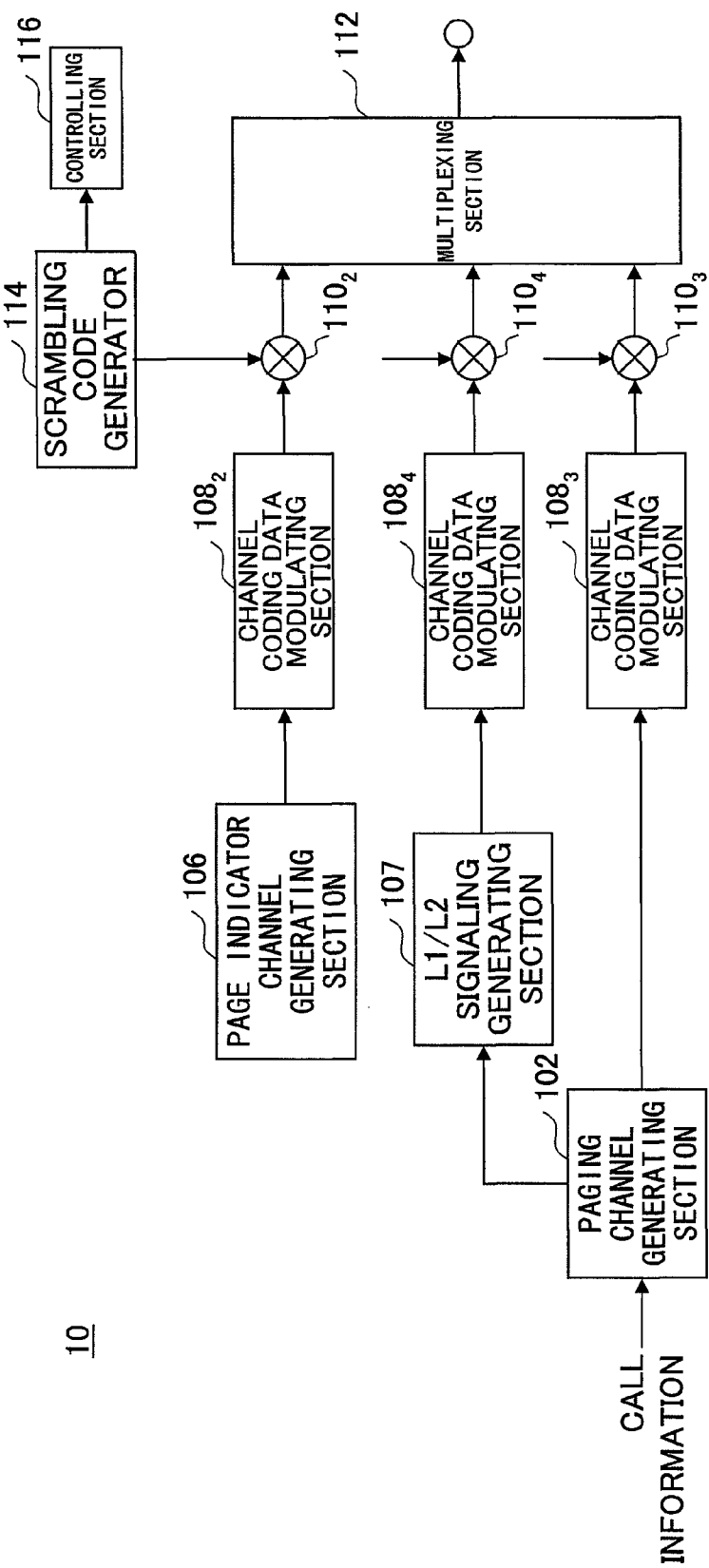

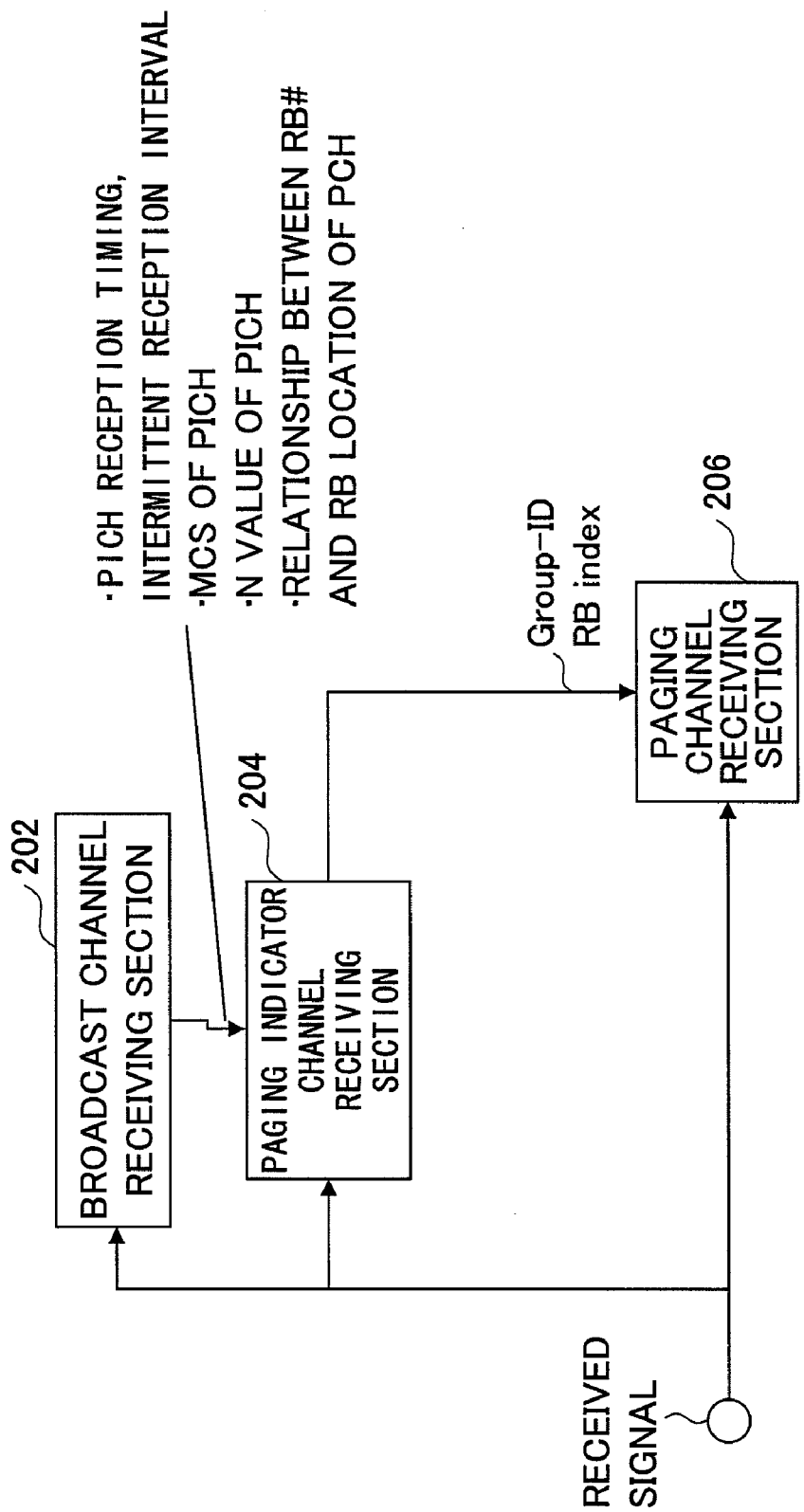

TRANSMITTING APPARATUS, RECEIVING APPARATUS, AND PAGING INFORMATION RECEPTION METHOD

TECHNICAL FIELD

The present invention relates to a transmitting apparatus, a receiving apparatus, and a paging information reception method.

BACKGROUND ART

In a mobile communication system, when a call to a terminal has arrived, it is required to inform the terminal of the arrival of the call. A network of the mobile communication system manages the location information of the terminal using a location registration area, and a Location Area Identifier (LAI) is assigned to each location registration area. In the network, the message indicating the arrival of the call to the terminal is broadcasted to each of the terminals in the location registration area where the location of the terminal is registered. This process is called "paging" (see, for example, Non Patent Document 1).

A receiving process of paging information in a W-CDMA system is described with reference to FIG. 1.

First, a receiving apparatus receives a paging indicator channel (PICH) (step S2). The PICH includes a group ID of users who are to receive a paging channel (PCH). For example, as shown in FIG. 2, a flag for each group ID is provided. When, for example, the number of the user groups is 72, seventy two bits (flags) are provided. By using the PICH, more than one group ID may be called at a time.

Next, the receiving apparatus receives the PCH (step S4). The PCH is to be received by a user whose group ID is designated by the PICH. The PCH includes the user ID of a user who is being called. For example, the user ID is called "TMSI (Temporary Mobile Subscriber Identity)" and is expressed by 32 bits. In a W-CDMA system, a single PCH may call up to five user IDs. Further, a "Cause ID" indicating the reason of the call is added. The "Cause ID" may indicate communication types such as voice and has approximately 2 or 3 bits.

Next, the receiving apparatus receives a broadcast channel (BCH). The user who is called by the PCH checks current restrictions and receives the latest interference amount information before transmitting a random access channel (RACH) to perform an Initial Access (step S6).

Non Patent Document 1: "W-CDMA mobile communication system" by Keiji TACHIKAWA, Maruzen K.K. pp. 255-256.

DISCLOSURE OF INVENTION

Problems to be Solved by the Invention

However, the above-mentioned prior art has the following drawback.

The transmission amount is disadvantageously large since the paging information of all the group IDs is transmitted at a time.

The present invention is made in light of the circumstance and may provide a transmitting apparatus, a receiving apparatus, and a paging information reception method capable of reducing the number of control bits with respect to the paging.

Means for Solving the Problems

To overcome the drawback, according to an aspect of the present invention, there is provided a transmitting apparatus including a paging indicator information generating unit generating paging indicator information including a group ID of users who are to receive a paging channel and information indicating a radio resource in which the paging channel is transmitted; and a multiplexing unit multiplexing the paging indicator information.

Based on the configuration, the number of bits with respect to the paging indicator information may be reduced.

According to another aspect of the present invention, there is provided a receiving apparatus including a broadcast information receiving unit receiving a broadcast channel including a number of group IDs of users who are to receive a paging channel and information indicating a correspondence between a number of and locations of frequency blocks assigned to the paging channel; a paging indicator information receiving unit receiving, based on the information indicating the number of the group IDs, paging indicator information including the group ID of the users who are to receive the paging channel and information indicating a radio resource for the paging channel; and a paging information receiving unit receiving, based on the group ID, the paging channel including information indicating a user ID to be called.

Based on the configuration, the group ID, transmitted by the broadcast channel (BCH), of the users who are to receive the paging channel (PCH) may be specified based on the number of the group IDs of the users who are to receive the paging channel (PCH).

According to still another aspect of the present invention, there is provided a paging information reception method including a broadcast information receiving step of receiving a broadcast channel including a number of group IDs of users who are to receive a paging channel and information indicating a correspondence between a number of and locations of frequency blocks assigned to the paging channel; a paging indicator information receiving step of receiving, based on the information indicating the number of the group IDs, paging indicator information including the group ID of the users who are to receive the paging channel and information indicating a radio resource for the paging channel; and a paging information receiving step of receiving, based on the group ID, the paging channel including information indicating a user ID to be called.

By doing this, the group ID, transmitted by the broadcast channel (BCH), of the users who are to receive the paging channel (PCH) may be specified based on the number of the group IDs of the users who are to receive the paging channel (PCH).

Advantageous Effect of the Invention

According to an embodiment of the present invention, a receiving apparatus and a paging information reception method capable of reducing the number of control bits with respect to the paging may be provided.

BRIEF DESCRIPTION OF THE DRAWINGS

FIG. 5B is a drawing showing another example of the mapping of the paging information according to an embodiment of the present invention;

FIG. 10 is a partial block diagram showing a transmitting apparatus according to an embodiment of the present invention;

FIG. 11 is a partial block diagram showing a receiving apparatus according to an embodiment of the present invention;

EXPLANATION OF REFERENCES

Figure 1:
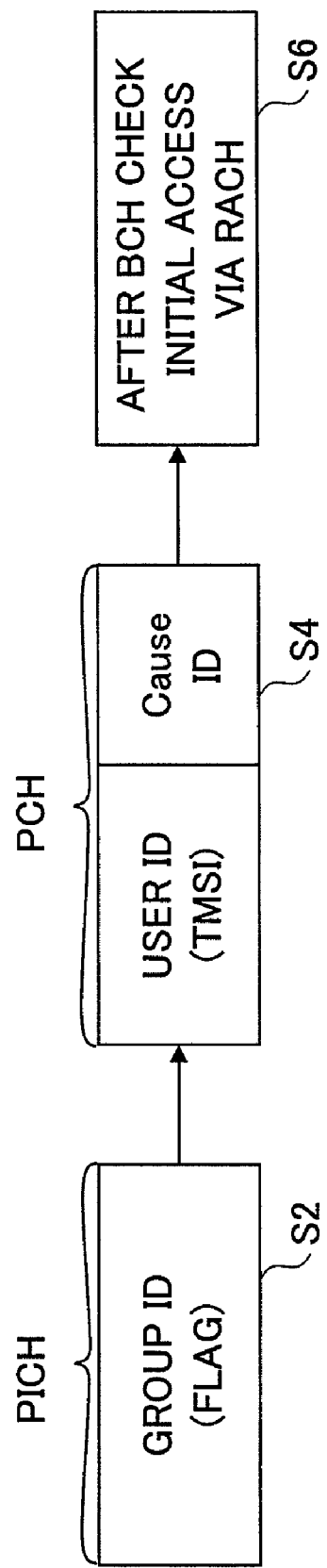
FIG. 1 is a flowchart showing a process of receiving paging information.
Figure 2:
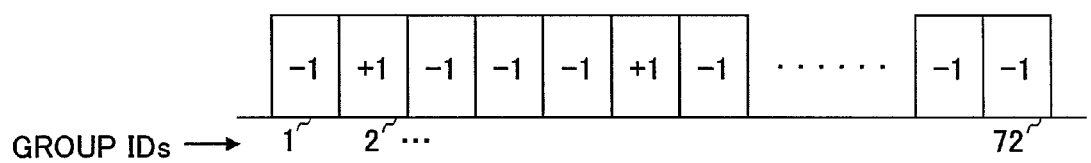
FIG. 2 is a drawing showing the group IDs.

10 TRANSMITTING APPARATUS
20 RECEIVING APPARATUS

BEST MODE FOR CARRYING OUT THE INVENTION

Next, an embodiment of the present invention is described with reference to the accompanying drawings.

It should be noted that in each of the drawings, the same reference numerals are commonly used for the elements having the same function and the repeated description of the same elements is herein omitted.

A radio communication system according to an embodiment of the present invention is described.

A radio communication system according to an embodiment of the present invention includes a base station and a mobile station. The base station includes a transmitting apparatus 10, and the mobile station includes a receiving apparatus 20.

Next, the transmitting apparatus 10 according to an embodiment of the present invention is described with reference to FIG. 3.

Figure 4:
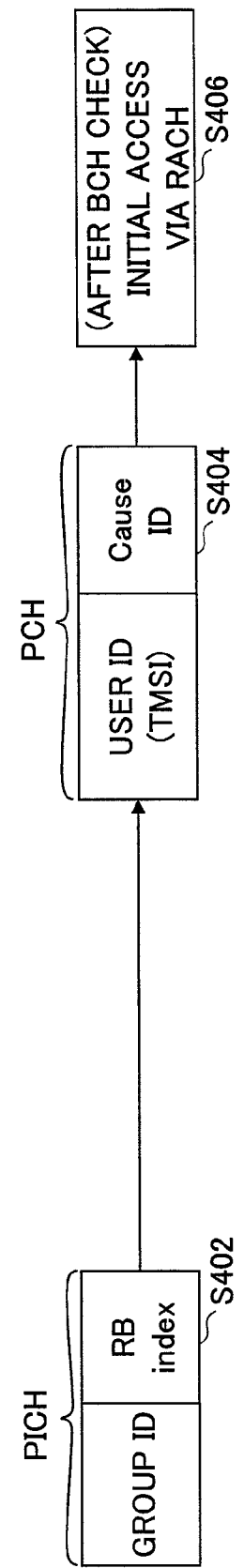
FIG. 4 is a flowchart showing a process of receiving paging information according to an embodiment of the present invention.

The transmitting apparatus 10 transmits a broadcast channel (BCH), a paging indicator channel (PICH), and a paging channel (PCH). By using the broadcast channel, the mobile station including the receiving apparatus 20 performs a cell search. Further, the mobile station including the receiving apparatus 20 determines whether a group ID of the mobile station is being called based on a received paging indicator channel as shown in FIG. 4. Upon determining that the group ID of the mobile station is being called, the mobile station acquires resource block index (RB index) information of the paging channel (step S402). Further, the mobile station including the receiving apparatus 20 determines whether the user ID (Temporary Mobile Subscriber Identity (TMSI)) of the mobile station is being called by receiving the paging channel. Upon determining that the user ID (TMSI) is being called, the mobile station receives a "Cause ID" indicating, for example, a communication type and showing a reason why the user ID is being called (step S404). After checking the broadcast channel (BCH), the mobile station performs an initial access via a random access channel (RACH) (step S406).

Figure 3:
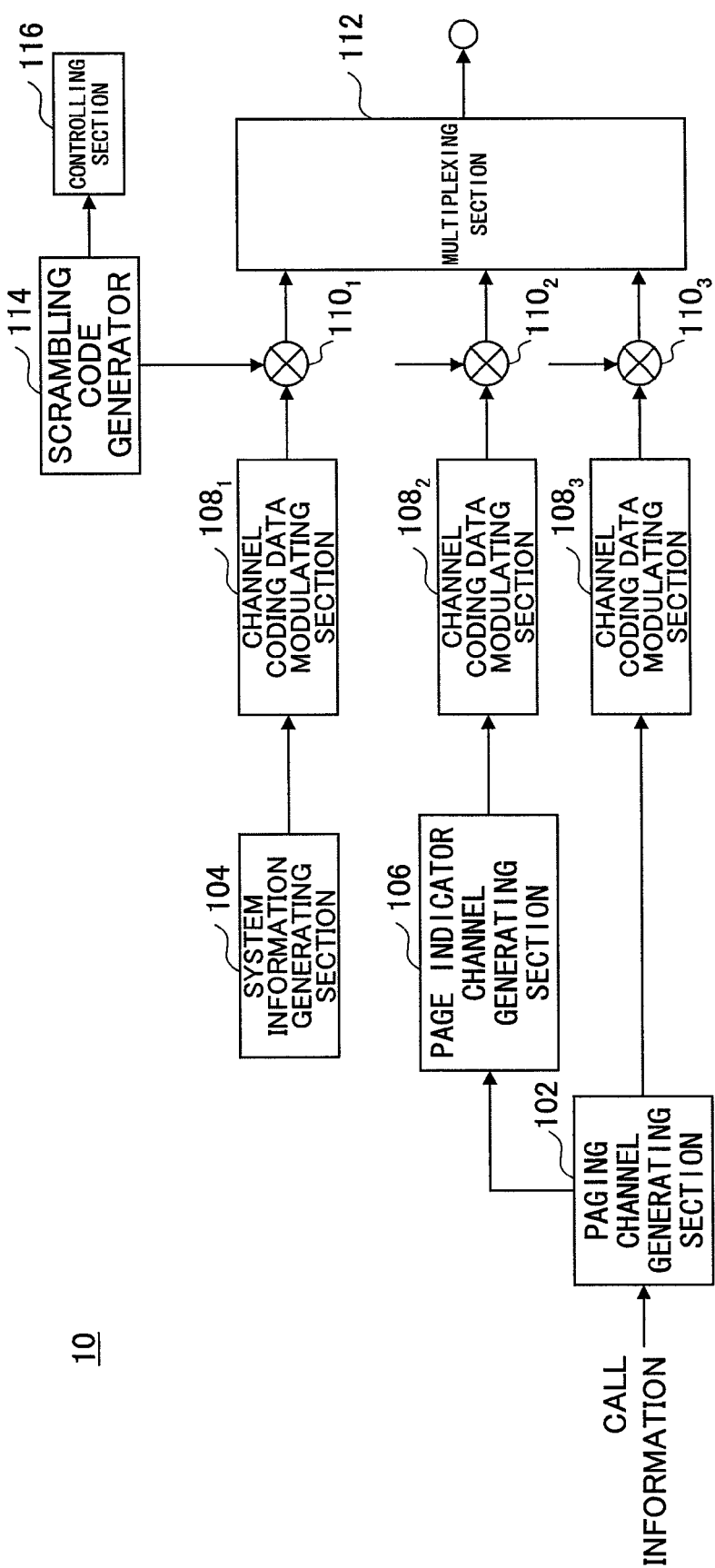
FIG. 3 is a block diagram showing a transmitting apparatus according to an embodiment of the present invention.

As shown in FIG. 3, the transmitting apparatus 10 includes a paging channel generating section 102, a system information generating section 104, a paging indicator channel generating section 106, channel coding data modulating sections $108_1$ through $108_3$, multiplying sections $110_1$ through $110_3$, a multiplexing section 112, a scrambling code generator 114, and a controlling section 116. The paging channel generating section 102 inputs a call signal from a network. The channel coding data modulating sections $108_3$ inputs an output signal from the paging channel generating section 102. The paging indicator channel generating section 106 is provided as paging indicator channel generating means. The channel coding data modulating sections $108_2$ inputs an output signal from the paging indicator channel generating section 106. The channel coding data modulating sections $108_1$ inputs an output signal from the system information generating section 104. The multiplying sections $110_1$, $110_2$, and $110_3$ input the output signals from the channel coding data modulating sections $108_1$, $108_2$, and $108_3$, respectively. The multiplexing section 112 inputs each of the output signals from the multiplying sections $110_1$, $110_2$, and $110_3$. The scrambling code generator 114 generates a scrambling code, which is input to each of the multiplying sections $110_1$, $110_2$, and $110_3$. The controlling section 116 controls the scrambling code input to the multiplying sections $110_1$, $110_2$, and $110_3$.

At least one of the system information items transmitted from the system information generating section 104 is encoded and modulated in the channel coding data modulating sections $108_1$, the system information items including a reception timing of the PICH, an intermittent reception interval, a Modulation and Coding Scheme (MCS) of the PICH, the maximum number of calls of the PICH, and the correspondence between the information indicating resource blocks of the PCH and the corresponding locations.

Further, the paging information generated in the paging channel generating section 102 based on the call signal input from the network is encoded and modulated in the channel coding data modulating sections $108_3$.

Further, the paging channel generating section 102 informs the paging indicator channel generating section 106 of the arrival of the call information. The paging indicator channel generating section 106 generates a paging indicator channel based on the call information from the paging channel generating section 102.

The paging indicator channel generated by the paging indicator channel generating section 106 is encoded and modulated in the channel coding data modulating sections $108_2$.

Then, the modulated system information, paging indicator channel, and paging channel are multiplied in the multiplying sections $110_1$ through $110_3$, respectively, by a cell-specific scrambling code and a sector-specific scrambling code. The scrambling codes under the control of the controlling section 116 are input from the scrambling code generator 114 to each of the multiplying sections $110_1$, $110_2$, and $110_3$.

The system information, the paging indicator channel, and the paging channel, each of which is multiplied by the scrambling code, are multiplexed with the broadcast channel, the paging indicator channel, and the paging channel, respectively in the multiplexing section 112.

Figure 5A:
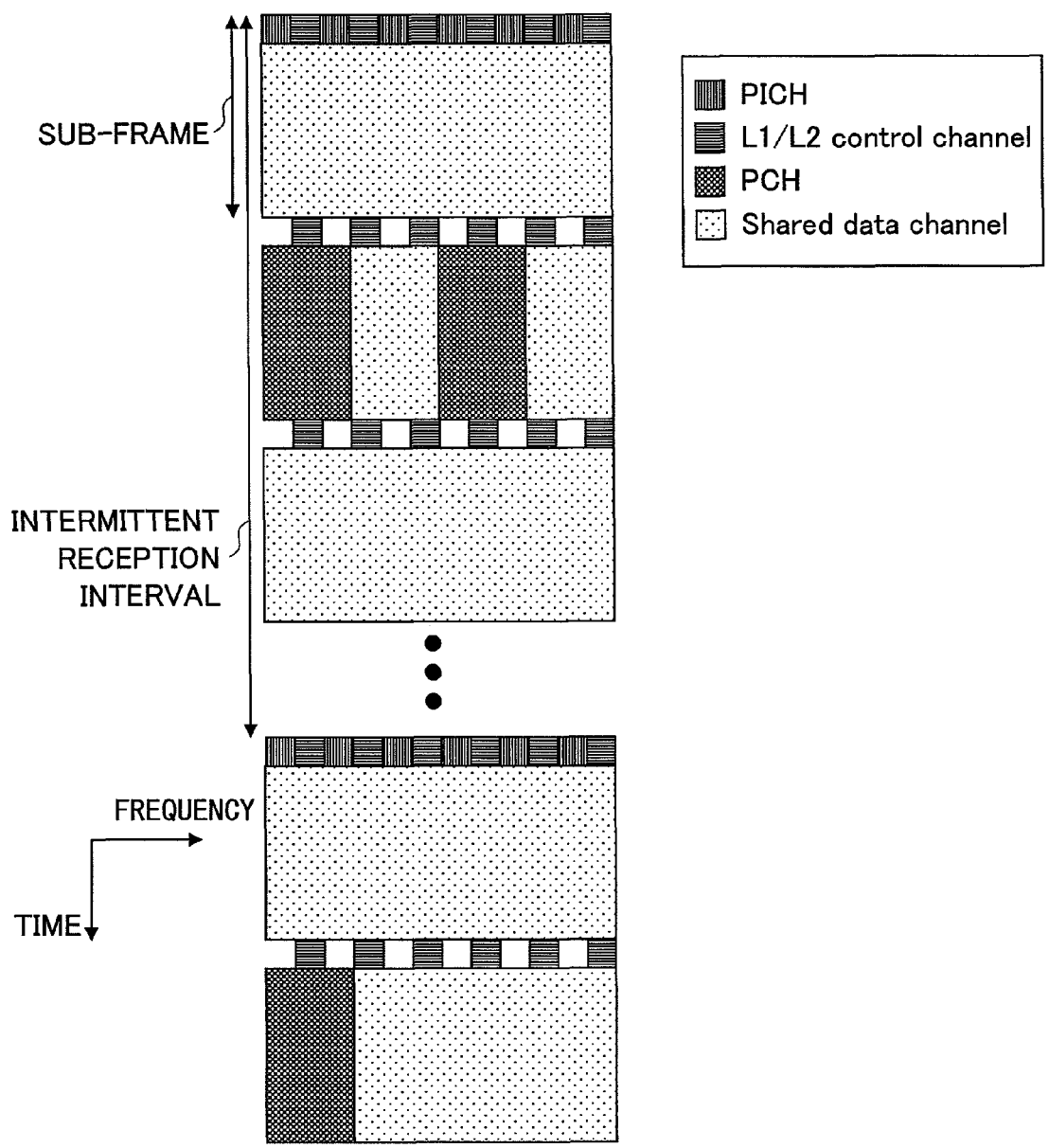
FIG. 5A is a drawing showing an example of a mapping of the paging information according to an embodiment of the present invention.

For example, in the multiplexing section 112, as shown in FIG. 5A, a mapping is performed so that the PICH is transmitted at least one sub-frame before the PCH is transmitted. Namely, the multiplexing section 112 performs mapping so that the paging indicator channel is separated from the paging channel by at least one sub-frame interval. By doing this, the receiving process of the receiving apparatus 20 may be simplified. Namely, the receiving apparatus 20 may determine whether the PCH is to be received based on the PICH. Therefore, preferably, the PICH is separated from the PCH by at least approximately one sub-frame interval. It should be noted that in FIG. 5A, other channels such as a pilot channel are omitted.

Further, when the PICH and the PCH are transmitted, the multiplexing section 112 may multiplex pilot channels. More specifically, as shown in FIG. 5B, when the PICH and the PCH are transmitted, a sector-common pilot channel for demodulating the PCH and the PICH is multiplexed with a sector-specific pilot channel for demodulating an L1/L2 control channel. Further, both the sector-common pilot channel and the sector-specific pilot channel may be transmitted in at least one of the same OFDM symbols.

Next, the process of generating the broadcast channel, the paging indicator channel, and the paging channel is described.

The system information generating section 104 generates the system information transmitted via the broadcast channel. The system information generating section 104 generates the information indicating at least one of the reception timing of the paging indicator channel (PICH), the intermittent reception interval, the MCS of the PICH, the maximum number of calls of the PICH, and the correspondence between the information indicating resource blocks of the paging channel and the corresponding locations.

According to the 3GPP Evolved UTRA and UTRAN, the system bandwidth may be in a range from 1.25 MHz to 20 MHz. However, according to a transmitting apparatus 10 according to an embodiment of the present invention, the transmission bandwidth of the broadcast channel is 1.25 MHz, or 1.25 MHz or 5 MHz. By determining the transmission bandwidth of the broadcast channel in advance, the mobile station may receive the broadcast channel even when the system bandwidth is unknown to the mobile station, and the mobile station may recognize the system bandwidth by receiving the broadcast channel.

Further, when the broadcast channel is transmitted over the same center frequency as that of a synchronization channel, the mobile station may receive the broadcast channel immediately after performing a cell search without necessarily changing the center frequency. As a result, the mobile station may acquire minimally required system information in a short time. Further, by arranging the transmission so that the center frequency of the broadcast channel is the same as the center of the system bandwidth, the receiving process of the mobile station may be simplified.

Further, by arranging the transmission so that the transmission bandwidth of the broadcast channel is narrower than the minimal required bandwidth for each of the mobile stations to receive the channel, each of the mobile stations may receive the broadcast channel.

Figure 6:
FIG. 6 is a drawing showing the group IDs in a paging indicator channel (PICH) according to an embodiment of the present invention.

The paging indicator channel generating section 106 generates paging indicator information based on the call signal from the network. As the paging indicator information, the paging indicator channel generating section 106 generates a group ID of the users who are to receive the paging channel and the information indicating the resource block index (RB index) which indicates the radio resource information of the paging channel. For example, as the group ID, the paging indicator channel generating section 106 generates information directly designating the group ID. For example, as shown in FIG. 6, a call group ID having a prescribed number of bits such as six bits may be generated. It should be noted that FIG. 6 shows a case where four call group IDs each having six bits are generated. However, the number of the call group IDs may be more than or less than four.

In this case, up to four groups may be called at a time. The number of group IDs that are called at a time may be transmitted via the broadcast channel or the like. In this case, the number of bits required for the group IDs in the PICH is 4×6=24 bits. Since each call group ID has six bits, up to 128 group IDs may be indicated. In this case, when the number of call IDs is less than four, data zero may be input. As described above, by directly specifying the group ID, the number of bits used for the group ID of the users who are to receive the PCH may be reduced. When a method is employed in which the group ID is directly specified, the number of group IDs that can be called at a time may be limited. However, this limitation may be overcome by using a method that allows increasing the number of group IDs that are called at a time.

Figure 7:
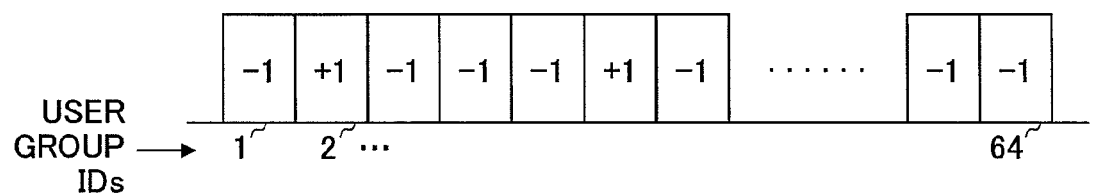
FIG. 7 is a drawing showing a format of the paging indicator channel (PICH)

Conventionally, the group IDs are specified by using flags. In the method using flags, as shown in FIG. 7, the same number of flags as that of the user groups of the users who are to receive the PCH is required because the groups to be called are specified by using a prescribed value of the flags. For example, as shown in FIG. 7, a flag is provided for each of the group IDs, and by setting the value of the flag "+1", the groups to be called are designated.

Further, the paging indicator channel generating section 106 generates information indicating the number of RBs assigned to the PCH as the information indicating the RB index. In this case, the location of the RBs in the PCH corresponding to the information indicating the number of RBs is determined by the system in advance. Herein, the term "resource block" refers to frequency blocks dividing the system bandwidth in a manner so that the system bandwidth is divided into continuous sub-carrier frequency blocks.

Figure 8A:
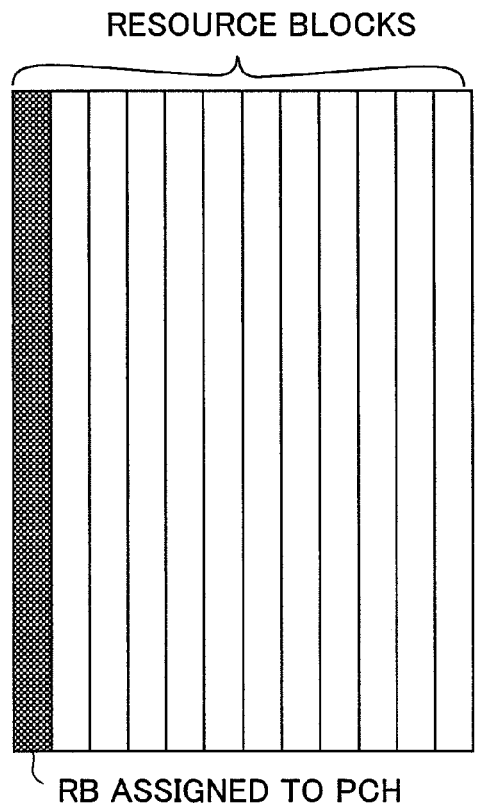
FIG. 8A is a drawing showing an example of a resource block index in the paging indicator channel (PICH) according to an embodiment of the present invention.

For example, as shown in FIG. 8A, when a numeral "1" is generated as the information indicating the number of the RBs, a prescribed resource block among plural resources blocks is assigned to the PCH in advance. For example, when the total number of the resource blocks is 12, the first resource block is assigned to the PCH.

Figure 8B:
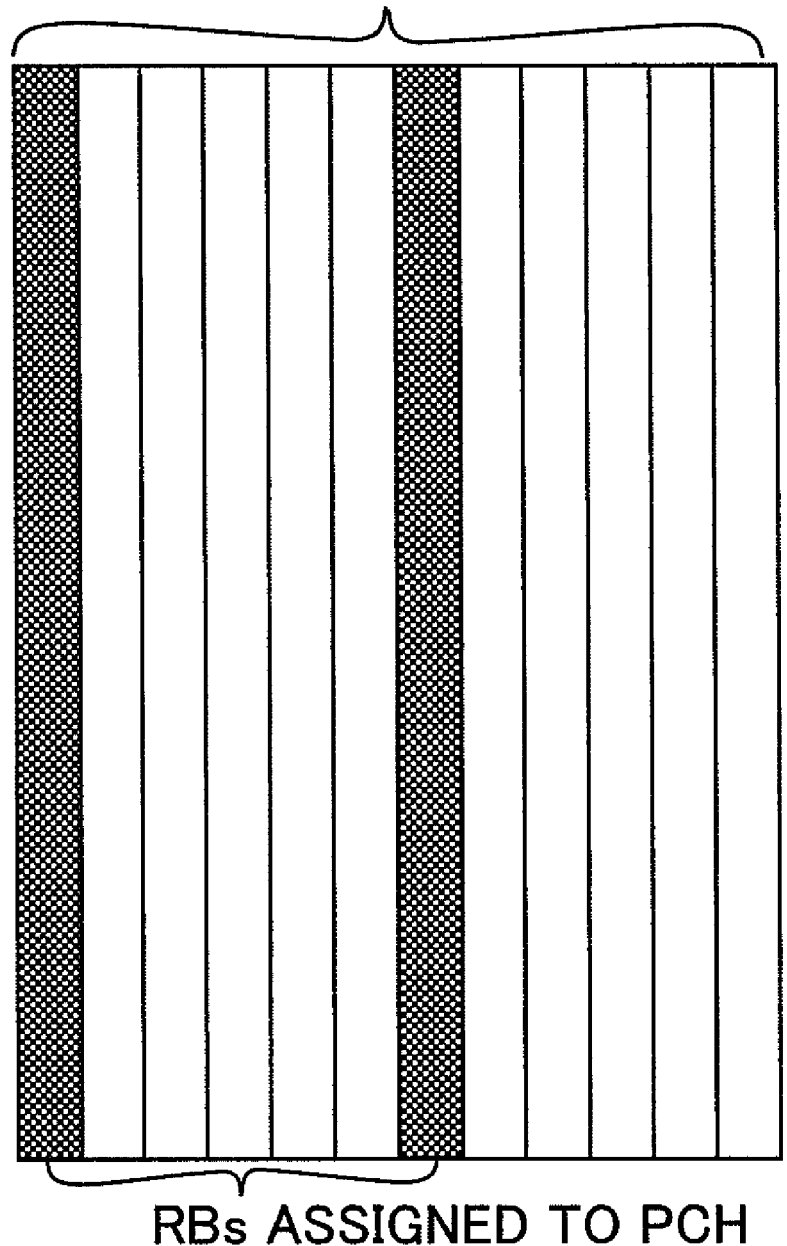
FIG. 8B is a drawing showing another example of the resource block index in the paging indicator channel (PICH) according to an embodiment of the present invention.

Further, for example, as shown in FIG. 8B, when a numeral "2" is generated as the information indicating the number of the RBs, two prescribed resource blocks among plural resources blocks are assigned to the PCH in advance. For example, when the total number of the resource blocks is 12, first and seventh resource blocks are assigned to the PCHs.

Figure 8C:
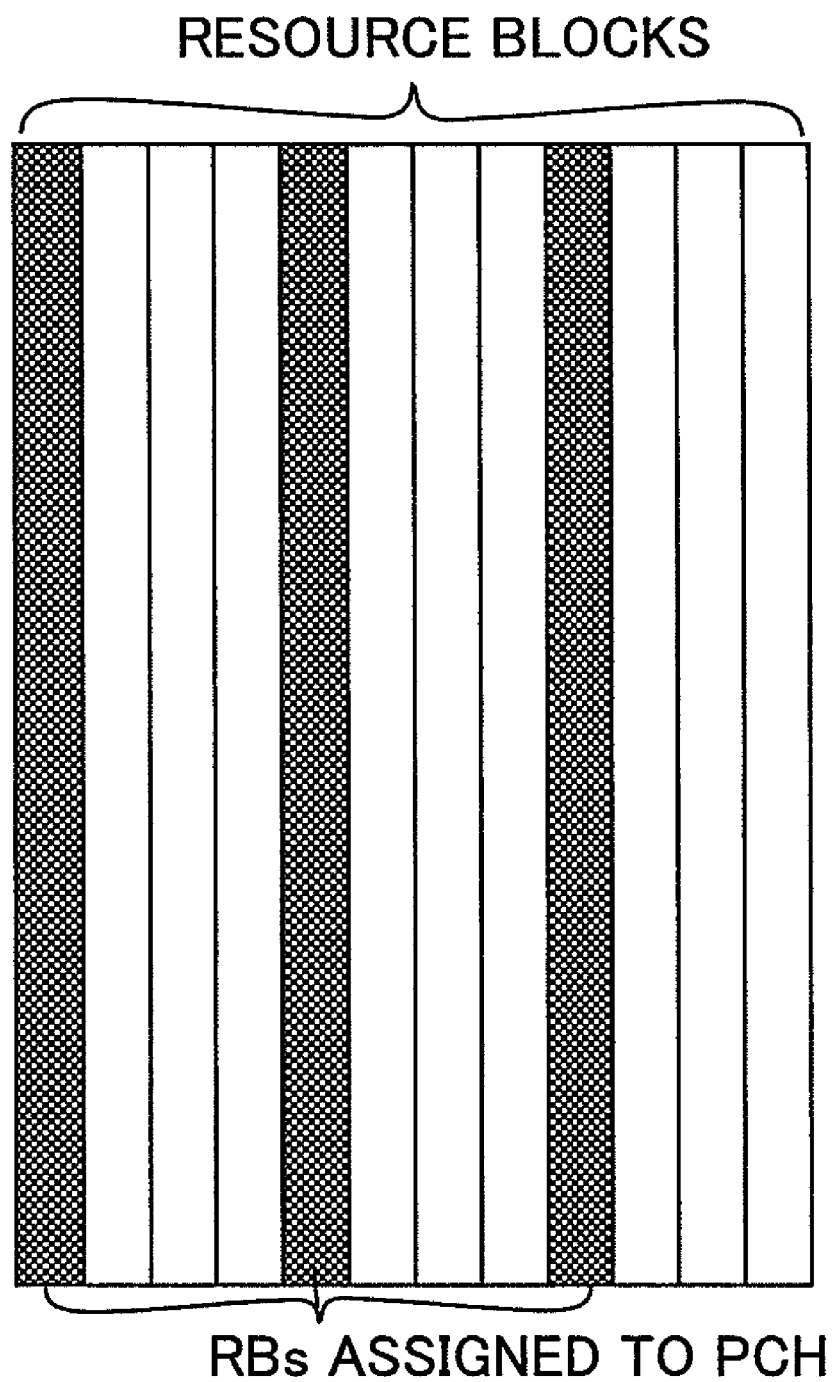
FIG. 8C is a drawing showing still another example of an resource block index in the paging indicator channel (PICH) according to an embodiment of the present invention.

Further, for example, as shown in FIG. 8C, when a numeral "3" is generated as the information indicating the number of the RBs, three prescribed resource blocks among plural resources blocks are assigned to the PCH in advance. For example, when the total number of the resource blocks is 12, first, fifth, and ninth resource blocks are assigned to the PCHs.

The paging channel generating section 102 generates paging information. As the paging information, the paging channel generating section 102 generates the user ID and the information indicating the Cause ID. As described below, when the paging indicator information and the paging information are transmitted, the same scrambling code among the sectors of the same base station is multiplied so that a soft combining reception may be applied in a receiver.

Further, the paging indicator channel and the paging channels may be transmitted by using the same center frequency as that used for the transmission of the broadcast channel. By doing this, the receiving process in the mobile station may be simplified.

Further, the paging indicator channel and the paging channels may be transmitted by using the same center frequency as that of the system bandwidth. By doing this, the receiving process in the mobile station may be simplified.

Further, the transmission bandwidth of the paging channel may be narrower than the minimal required bandwidth for each of the mobile stations to receive the channel. By doing this, each of the mobile stations may receive a paging signal.

Further, the paging channel may be transmitted by using one or a part of one radio resource block. By doing this, the receiving process in the mobile station may be simplified.

Next, a process of the controlling section 116 is described.

In a CDMA system, when similar signals are transmitted in plural base stations and plural sectors, a mobile station located at a sector boundary may receive both signals. Namely, the mobile station may receive signals from both sectors. In this case, however, double radio resources may be necessarily used in the base station, and signals from both sectors may interfere with each other at the mobile station, thereby disadvantageously increasing the waste of the resources and reducing the efficiency of the system.

In an OFDMA system, on the other hand, when the common scrambling code is used among the sectors and the transmission timings are synchronized, the signals from the adjacent sectors may not interfere with each other and may be combined with each other upon receiving the signals (soft combining mechanism).

More specifically, the controlling section 116 controls so that the same scrambling code is applied to each of the paging indicator information and the paging information transmitted via the paging indicator channel and the paging channel, respectively, and the transmission timings of the channels are synchronized. For example, the base station transmits the paging indicator information and the paging information each multiplied with the common scrambling code from both sectors at the same timings by the coordination of a scheduler between the sectors. By doing this, the receiver may receive the paging indicator information combined with the paging information.

Further, the controlling section 116 may use sector-specific orthogonal codes in each of the sectors with respect to the paging indicator information and the paging information transmitted via the paging indicator channel and the paging channel, respectively. As a result, the orthogonal code specific to each sector is multiplied with the paging indicator channel and the paging channel in the frequency domain.

By doing this, at a receiver, the orthogonality of the paging indicator channel and the paging channel between the sectors in the same base station may be maintained. As a result, the paging indicator channel and the paging channel in each sector may be received without being interfered with by those of the other sectors.

Figure 9A:
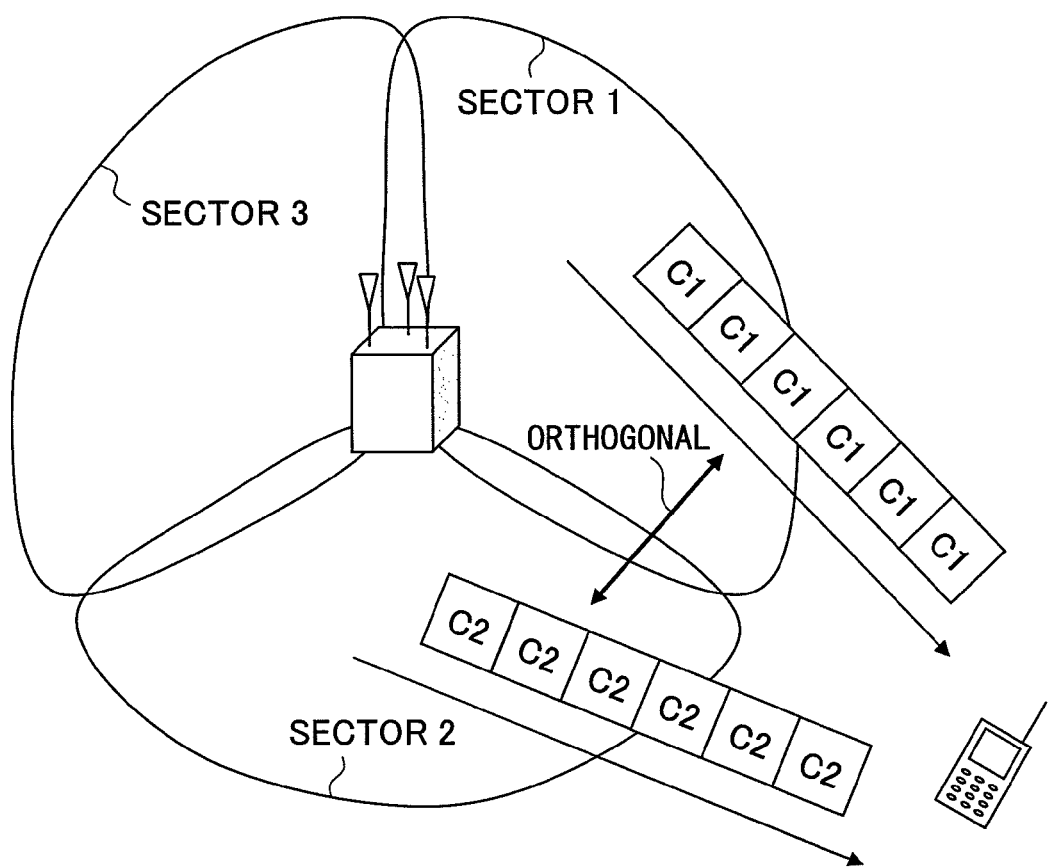
FIG. 9A is a drawing showing a transmission method of the paging indicator channel (PICH) and a paging channel (PCH) according to an embodiment of the present invention.
Figure 9B:
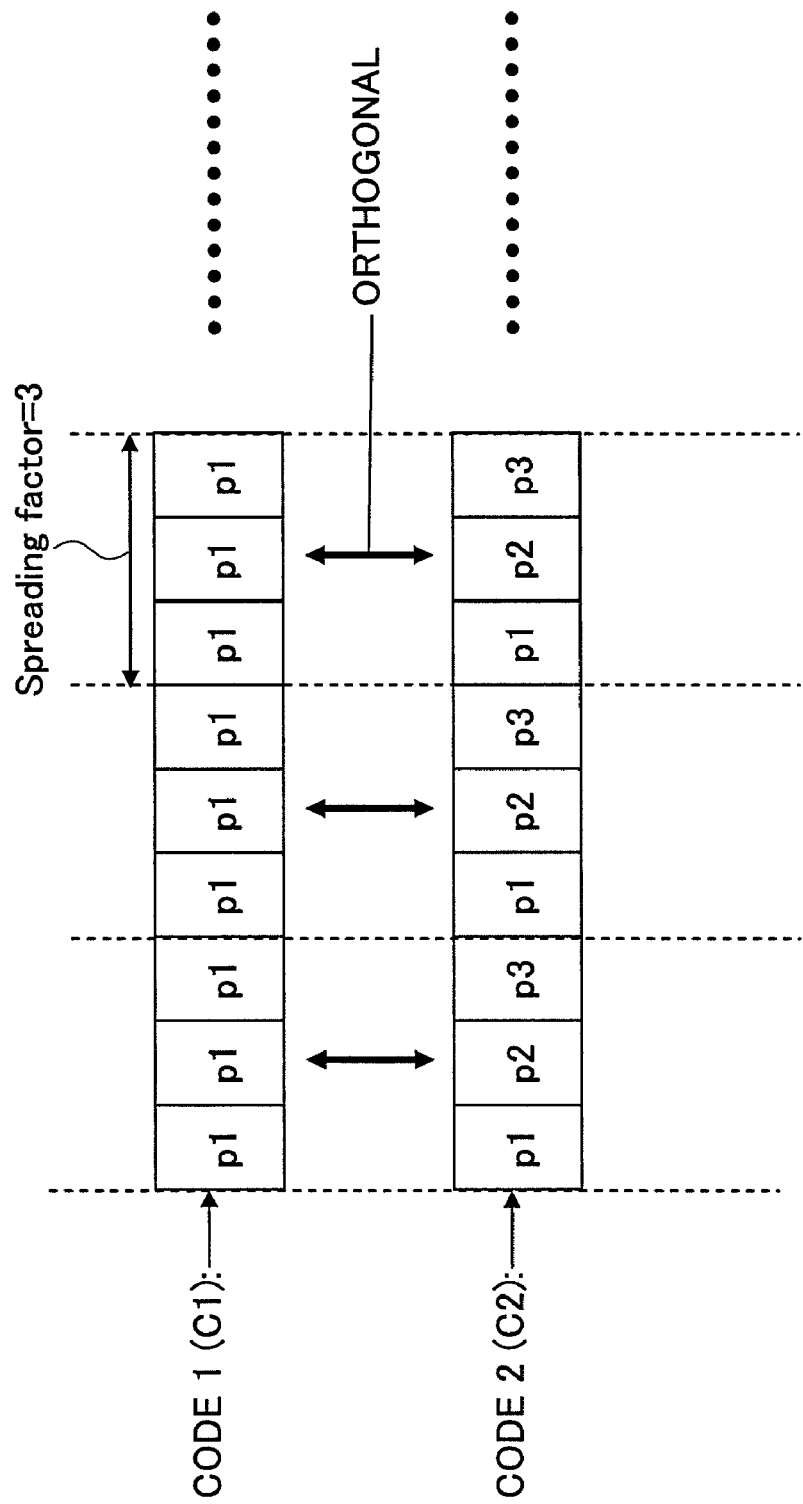
FIG. 9B is another drawing showing a transmission method of the paging indicator channel (PICH) and a paging channel (PCH) according to an embodiment of the present invention.

As an example, a case is described with reference to FIGS. 9A and 9B where different orthogonal codes "C1" and "C2" are used in sectors 1 and 2, respectively.

From the sector 1, the paging indicator channel and the paging channel, each multiplied with the scrambling code "C1", are transmitted. In the same manner, from the sector 2, the paging indicator channel and the paging channel, each multiplied with the scrambling code "C2", are transmitted. For example, as shown in FIG. 9B, the code 1 may have a stream of data "p1, p1, p1, p1, p1, p1, p1, p1, p1, ...", and the code 2 may have a stream of data "p1, p2, p3, p1, p2, p3, p1, p2, p3, ..." (this is a case where the "Spreading factor"=3). In this case, when, for example, $p1=1$, $p2=\exp\{j(2/3)\pi\}$, and $p3=\exp\{-j(2/3)\pi\}$ are given, the codes 1 and 2 become orthogonal with each other. As a result, since the codes "C1" and "C2" are orthogonal with each other, the paging indicator channel and the paging channel may be received without being interfered with by those of the other sector.

Further, the paging indicator information may be transmitted via the L1/L2 control channel. To achieve the configuration, as shown in FIG. 10, the transmitting apparatus 10 includes an L1/L2 signaling generating section 107, a channel coding data modulating section $108_4$, and a multiplying section $110_4$. The L1/L2 signaling generating section 107 inputs the output signal from the paging channel generating section 102. The channel coding data modulating section $108_4$ inputs the output signal from the L1/L2 signaling generating section 107. The multiplying section $110_4$ inputs the output signal from the channel coding data modulating section $108_4$. The output signal from the multiplying section $110_4$ is input to the multiplexing section 112. A scrambling code generated by the scrambling code generator 114 is input to the multiplying section $110_4$.

The L1/L2 signaling generating section 107 generates the group ID and the information indicating the RB index. The group ID and the information indicating the RB index are encoded and modulated in the channel coding data modulating section $108_4$.

Further, a signal serving as a trigger may be transmitted via the paging indicator channel, and the paging indicator information may be transmitted via the L1/L2 control channel. In this case, the transmitting apparatus 10 has the same configuration as that of the transmitting apparatus as shown in FIG. 10. The paging indicator channel generating section 106 generates the signal serving as the trigger. The L1/L2 signaling generating section 107 generates the group ID and the information indicating the RB index.

Further, the group ID and the information indicating the RB index in the paging indicator information may be transmitted via the paging indicator channel and the L1/L2 control channel, respectively. In this case, the transmitting apparatus 10 has the same configuration as that of the transmitting apparatus shown in FIG. 10. The paging indicator channel generating section 106 generates the group ID, and the L1/L2 signaling generating section 107 generates the information indicating the RB index.

The mobile station is informed of being paged by a PI function based on a DRX cycle.

The base station may change the DRX (Discontinuous Reception) and announce the changed cycle.

When the cycle (DRX cycle) between timings when a mobile station is informed of being paged by the PI function becomes longer, the intermittent reception interval of the mobile station becomes accordingly longer and the consumption of the battery energy may be reduced. However, in this case, the paging delay is increased. By changing the DRX cycle, the operational flexibility may be improved.

In this case, the changed DRX cycle may be announced as the system information. Further, the DRX cycle may also be changed for each of the cells.

Further, the transmitting apparatus 10 may use transmission diversity adopted to perform a paging operation with respect to a channel having the PI function such as the PICH or the L1/L2 control channel, or the paging channel transmitting the paging information. By using the transmission diversity, it becomes possible to effectively transmit paging control information. More specifically, it becomes possible to perform radio resource transmission in a shorter time period, with fewer frequencies, and with less energy consumption.

Further, the controlling section 116 may be arranged so that a common scrambling code and transmission timings are applied to the broadcast channel.

In a paging process, unlike typical transmission of a data channel, no control loop between the base station and the mobile station is established. Therefore, open-loop transmission diversity may be suitably used. For transmission diversity, any of STBC (Space Time Block Code), SFBC (Space Frequency Block Code), TSTD (Time Switched Transmit Diversity) in which transmission antennas are changed every predetermined time period, and FSTD (Frequency Switched Transmit Diversity) in which each transmission antenna is used for the corresponding frequency range may be used.

Further, in the transmitting apparatus 10, time diversity may be applied to a channel having the PI function such as the PICH or the L1/L2 control channel, or the paging channel transmitting the paging information.

By using time diversity, it becomes possible to effectively transmit the paging control information. More specifically, it becomes possible to perform radio resource transmission in a shorter time, with fewer frequencies, and with less energy consumption. For example, as the time diversity, a repeat transmission may be used. By doing this, it becomes possible to make the transmitter simpler and use simple Chase combining in the receiver, thereby enabling high-quality data reception.

Further, when plural transmissions are performed as the time diversity, a frequency-hopping technique may be used within predetermined frequency blocks. By doing this, the frequency diversity effect as well as the time diversity effect may be obtained, thereby enabling high-quality paging.

Further, the radio resource blocks assigned to the paging channel may be changed every predetermined time period. By doing this, the channel load may be distributed, thereby enabling effective use of the radio resources.

Further, as the transmission method to obtain the frequency diversity effect, either the Distributed transmission method or the Localized transmission method may be used.

Further, the frequency diversity may be performed by repeating on the frequency axis or using channel coding. By doing this, a frequency diversity effect may be obtained, thereby enabling high-quality paging.

Next, the receiving apparatus 20 according to an embodiment of the present invention is described with reference to FIG. 11.

The receiving apparatus 20 according to an embodiment of the present invention includes a broadcast channel receiving section 202 as broadcast information reception means to input a receiving signal, a paging indicator channel (PICH) receiving section 204 as paging indicator information reception means, and a paging channel (PCH) receiving section 206 as paging information reception means.

The broadcast channel receiving section 202 receives the broadcast information (BCH). The broadcast information includes the reception timing of the PICH, the intermittent reception interval, the MCS of the PICH, the maximum number of calls of the PICH, and the correspondence between the information indicating resource blocks of the PCH and the corresponding locations.

The broadcast channel receiving section 202 transmits the received broadcast information to the paging indicator channel (PICH) receiving section 204, the received broadcast information including the reception timing of the PICH, the intermittent reception interval, the MCS of the PICH, the maximum number of calls of the PICH, and the correspondence between the information indicating resource blocks of the PCH and the corresponding locations.

The paging indicator channel receiving section 204 receives paging indicator information based on the MCS of the PICH and the maximum number ("N") of calls of the PICH in the input paging indicator information. The PICH receiving section 204 receives the paging indicator information, refers to the group ID of the users in the paging indicator information, and determines whether the group ID of the mobile station is included. For example, the paging indicator channel receiving section 204 refers to the call group ID in the input paging indicator information and determines whether the group ID of the mobile station is included. When it is determined that the group ID of the mobile station is included, the paging indicator channel receiving section 204 transmits the group ID of the mobile station and the RB index to the paging channel receiving section 206.

The paging channel receiving section 206 receives the paging channel based on the input group ID and the RB index.

Further, the paging indicator channel receiving section 204 receives the page indicator channel using the soft combining.

When the group ID of the mobile station and the resource index are input, the paging channel receiving section 206 receives the paging channel, refers to the information indicating the user ID in the paging channel, and determines whether the user ID of the mobile station is included. When it is determined that the user ID of the mobile station is included, the mobile station transmits the RACH, performs the initial access, and starts the communication.

Further, the paging channel receiving section 206 receives the paging channel using the soft combining.

To perform the soft combining across the sectors, a channel estimation value of a receiving signal with respect to each sector is required.

In the receiving apparatus 20, each of the broadcast channel receiving section 202, the paging indicator channel receiving section 204, and the paging channel receiving section 206 acquires the channel estimation value for each sector by using the sector-specific pilot channels. Then, the channel estimation value for the soft combining may be obtained from the total of the acquired channel estimation values for each sector. When this method is used, since the sector-specific pilot channel is already necessary for receiving a common data channel and the like, it is not necessary to add an extra pilot channel.

Further, in the receiving apparatus 20, by receiving the sector-common pilot channel from the transmitting apparatus 10 separately, the channel estimation value for the soft combining may be directly acquired in each of the broadcast channel receiving section 202, the paging indicator channel receiving section 204, and the paging channel receiving section 206. By doing this, the channel estimation value may be easily acquired in the soft combining process.

Figure 12:
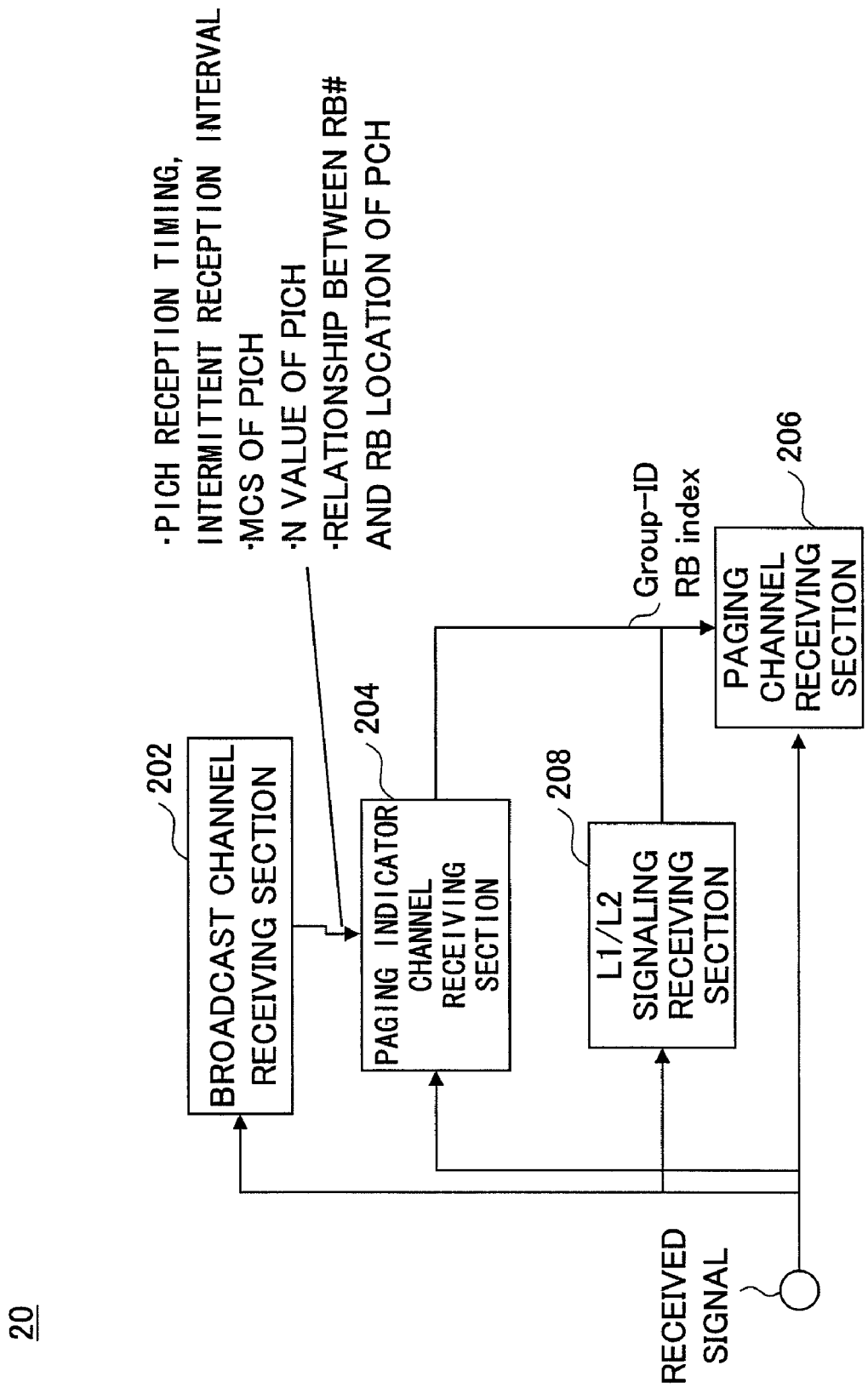
FIG. 12 is another partial block diagram showing a receiving apparatus according to an embodiment of the present invention.

Further, as shown in FIG. 12, when the group ID and the resource block index are transmitted via the L1/L2 control channel, the receiving apparatus includes a L1/L2 signaling receiving section 208 in addition to the configuration of the receiving apparatus in FIG. 11. The output signal from the L1/L2 signaling receiving section 208 is input to the paging channel receiving section 206.

Figure 13:
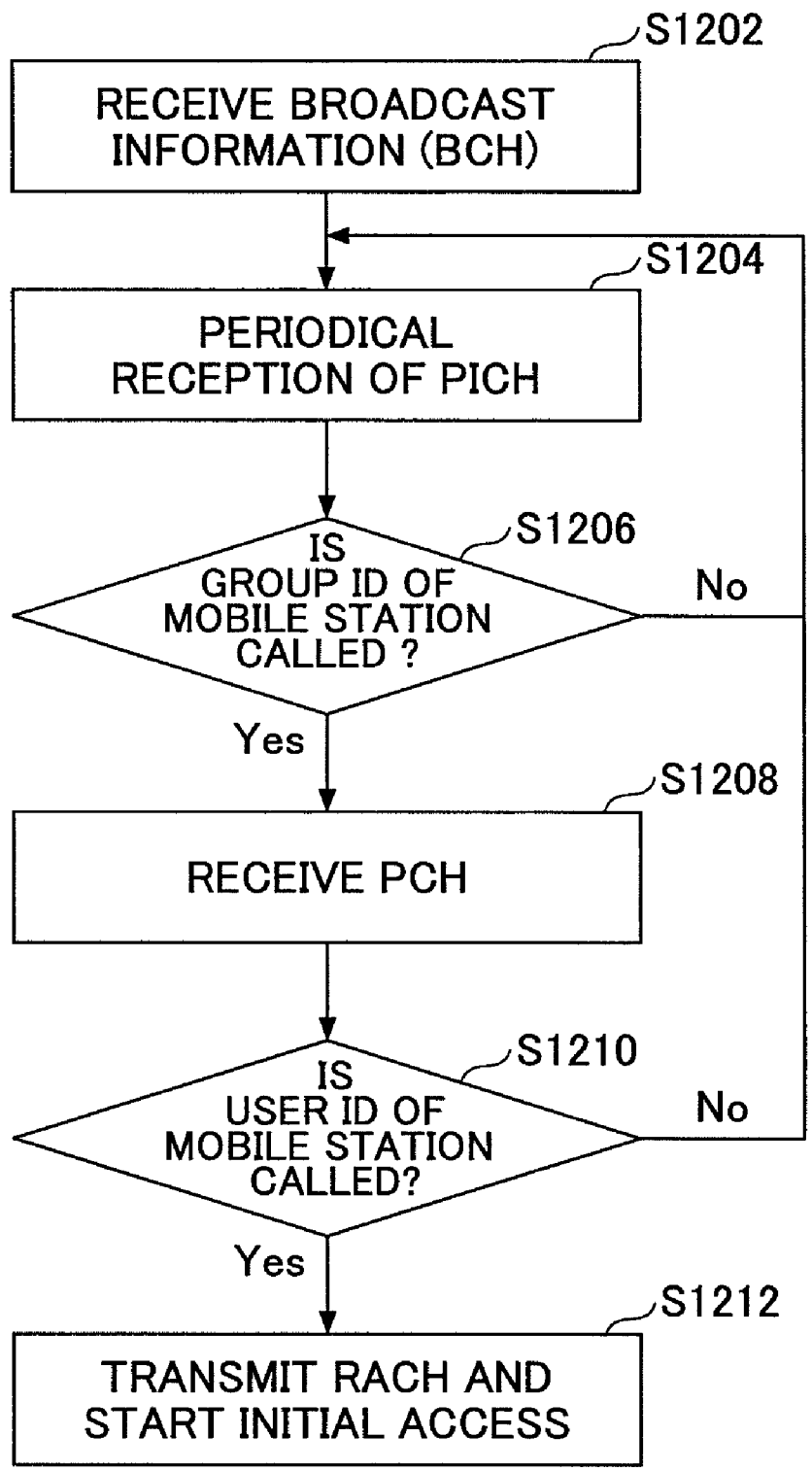
FIG. 13 is a flowchart showing the operations of a receiving apparatus according to an embodiment of the present invention.

Next, the operations of the receiving apparatus 20 according to an embodiment of the present invention are described with reference to FIG. 13.

The broadcast channel receiving section 202 receives the broadcast channel (BCH) (step S1202). For example, the broadcast channel receiving section 202 acquires the reception timing of the PICH, the intermittent reception interval, the MCS of the PICH, the maximum number of calls of the PICH, and the correspondence between the information indicating resource blocks of the PCH and the corresponding locations.

Next, the paging indicator channel receiving section 204 periodically receives the paging indicator channel (step S1204).

Next, based on the received paging indicator information, the paging indicator channel receiving section 204 determines whether the group ID of the mobile station is included (step S1206).

When it is determined that the group ID of the mobile station is included (YES in step S1206), the paging indicator channel receiving section 204 transmits the group ID and the resource block index (RB index) to the paging channel receiving section 206. As a result, the paging channel receiving section 206 receives the paging channel (step S1208).

On the other hand, when it is determined that the group ID of the mobile station is not included (NO in step S1206), the process goes back to step S1204.

Next, based on the received paging channel, the paging channel receiving section 206 determines whether the user ID of the mobile station is included (step S1210).

When it is determined that the user ID of the mobile station is included (YES in step S1210), the mobile station transmits the random access channel and performs the initial access (step S1212).

On the other hand, when it is determined that the user ID of the mobile station is not included (NO in step S1210), the process goes back to step S1204.

Figure 14:
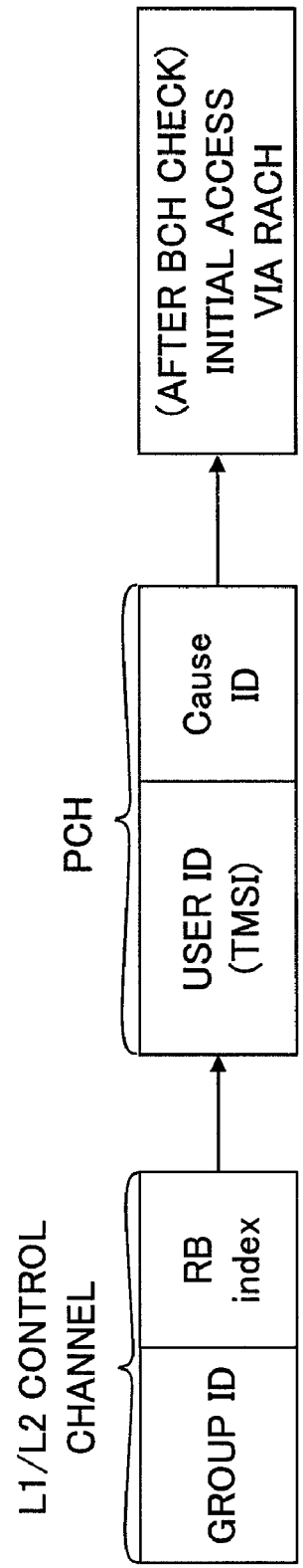
FIG. 14 is a drawing showing the operations of a receiving apparatus according to an embodiment of the present invention.

On the other hand, a case is described where the group ID and the RB index in the paging indicator information are transmitted via the L1/L2 control channel with reference to FIG. 14.

In this case, the L1/L2 signaling receiving section 208 receives the L1/L2 control channel transmitted from the transmitting apparatus 10 and transmits the group ID and the resource block index to the paging channel receiving section 206. Then the process from step S1206 described with reference to FIG. 13 is performed.

Figure 15:
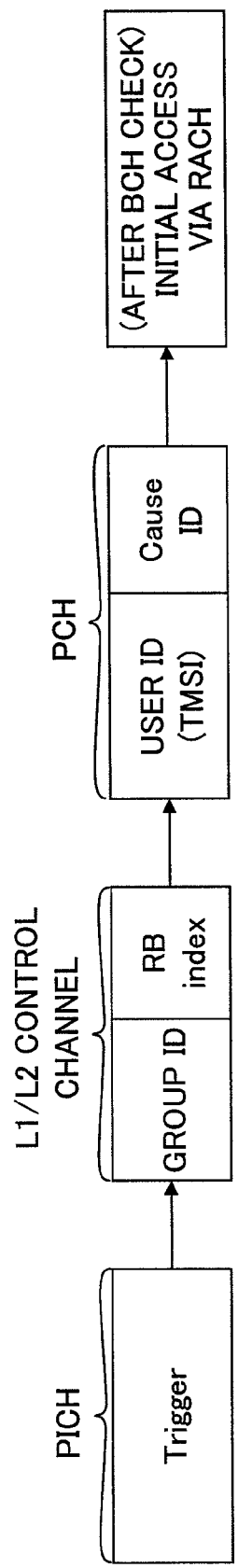
FIG. 15 is another drawing showing the operations of a receiving apparatus according to an embodiment of the present invention.

Further, a case is described where a signal serving as a trigger is transmitted via the paging indicator channel and the group ID and the RB index in the paging indicator information are transmitted via the L1/L2 control channel with reference to FIG. 15.

In this case, when the trigger signal transmitted from the transmitting apparatus 10 via the paging indicator channel is received by the paging indicator channel receiving section 204 as a trigger, the L1/L2 signaling receiving section 208 receives the L1/L2 control channel and transmits the group ID and the RB index to the paging channel receiving section 206. Then the process from step S1206 described with reference to FIG. 13 is performed.

Figure 16:
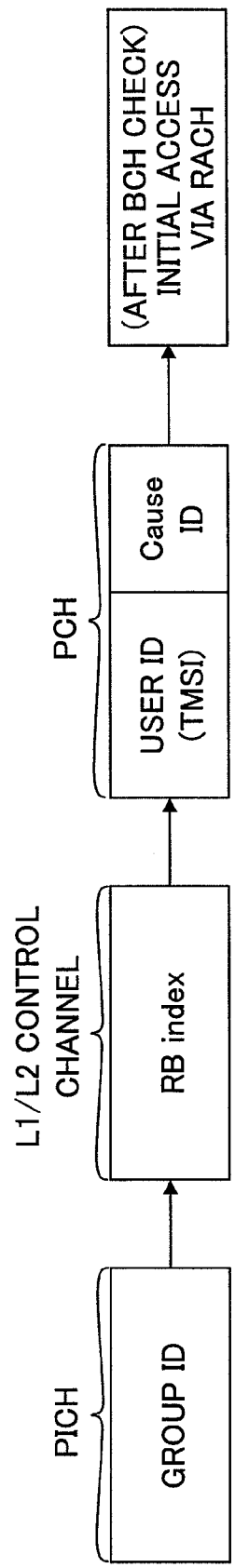
FIG. 16 is still another drawing showing the operations of a receiving apparatus according to an embodiment of the present invention.

Next, a case is described where the group ID in the paging indicator information is transmitted via the paging indicator channel and the information indicating the RB index of the paging indicator information is transmitted via the L1/L2 control channel with reference to FIG. 16.

In this case, the paging indicator channel receiving section 204 receives the paging indicator channel transmitted from the transmitting apparatus 10 and acquires the group ID. Then, the L1/L2 signaling receiving section 208 receives the L1/L2 control channel, acquires the resource block index, and transmits the acquired resource block index to the paging channel receiving section 206. Then, the process from step S1206 described with reference to FIG. 13 is performed.

The present international application claims priority from Japanese Patent Application No. 2006-127995 filed on May 1, 2006, the entire contents of which are hereby incorporated herein by reference.

INDUSTRIAL APPLICABILITY

A transmitting apparatus, a receiving apparatus, and a paging information reception method according to an embodiment of the present invention may be applied to a radio communication system.

The invention claimed is:

1. A transmitting apparatus comprising:
 a paging indicator information generating unit generating paging indicator information including a group ID of users who are to receive a paging channel and information indicating a radio resource in which the paging channel is transmitted; and
 a multiplexing unit multiplexing the paging indicator information,
 wherein the paging indicator information generating unit generates information indicating a frequency block assigned to the paging channel among frequency blocks dividing a system bandwidth in a manner so that the system bandwidth is divided into continuous sub-carrier frequency blocks,
 a number and a location of the frequency blocks assigned to the paging channel are associated in advance, and
 the paging indicator information generating unit generates information indicating the number of frequency blocks assigned to the paging channel.

2. The transmitting apparatus according to claim 1, wherein
 the paging indicator information generating unit generates the group ID having a prescribed number of bits.

3. The transmitting apparatus according to claim 1, wherein
 the multiplexing unit multiplexes the group ID with a page indicator channel and multiplexes the information indicating the radio resource with an L1/L2 control channel.

4. The transmitting apparatus according to claim 1, further comprising:
 a system information generating unit generating system information items including a number of the group IDs and a correspondence between a number and locations of frequency blocks assigned to the paging channel, wherein
 the multiplexing unit multiplexes the system information item with a broadcast channel.

5. The transmitting apparatus according to claim 1, wherein
 the multiplexing unit multiplexes the group ID and the information indicating the radio resource with an L1/L2 control channel.

6. The transmitting apparatus according to claim 5, wherein
the paging indicator information generating unit generates information serving as a trigger; and
the multiplexing unit multiplexes the trigger with a page indicator channel.

7. The transmitting apparatus according to claim 1, wherein
the multiplexing unit multiplexes the group ID and the information indicating the radio resource with a page indicator channel.

8. The transmitting apparatus according to claim 7, further comprising:
a controlling unit controlling so that a sector-specific orthogonal code is multiplied with the paging indicator channel and the paging channel in a frequency domain.

9. The transmitting apparatus according to claim 7, wherein
the multiplexing unit performs a mapping operation with respect to the paging indicator channel and the paging channel in a manner so that the paging indicator channel is separated from the paging channel by at least substantially one sub-frame interval.

10. The transmitting apparatus according to claim 7, wherein
the multiplexing unit multiplexes a sector-common pilot channel for demodulating the paging channel and the paging indicator channel with a sector-specific pilot channel for demodulating an L1/L2 control channel.

11. The transmitting apparatus according to claim 10, wherein
the multiplexing unit multiplexes the sector-common pilot channel and the sector-specific pilot channel with at least one of the same OFDM symbols.

12. The transmitting apparatus according to claim 7, further comprising:
a controlling unit controlling so that a common scrambling code and a common transmission timing are applied to the paging indicator channels and the paging channels between sectors.

13. A receiving apparatus comprising:
a broadcast information receiving unit receiving a broadcast channel including a number of group IDs of users who are to receive a paging channel and information indicating a correspondence between a number of and locations of frequency blocks assigned to the paging channel;
a paging indicator information receiving unit receiving, based on the information indicating the number of the group IDs, paging indicator information including the group ID of the users who are to receive the paging channel and information indicating a radio resource for the paging channel; and
a paging information receiving unit receiving, based on the group ID, paging channel including indicating a user ID to be called,
wherein the paging indicator information receiving unit receives information indicating a frequency block assigned to the paging channel among frequency blocks dividing a system bandwidth in a manner so that the system bandwidth is divided into continuous sub-carrier frequency blocks,
a number and a location of the frequency blocks assigned to the paging channel are associated in advance, and
the paging indicator information receiving unit receives information indicating the number of frequency blocks assigned to the paging channel.

14. The receiving apparatus according to claim 13, wherein
the paging indicator information receiving unit and the paging information receiving unit receive the paging indicator information and the paging information using a soft combining.

15. A paging information reception method comprising
a broadcast information receiving step of receiving a broadcast channel including a number of group IDs of users who are to receive a paging channel and information indicating a correspondence between a number of and locations of frequency blocks assigned to the paging channel;
a paging indicator information receiving step of receiving, based on the information indicating the number of the group IDs, paging indicator information including the group ID of the users who are to receive the paging channel and information indicating a radio resource for the paging channel; and
a paging information receiving step of receiving, based on the group ID, paging channel including indicating a user ID to be called,
wherein the paging indicator information receiving step includes receiving information indicating a frequency block assigned to the paging channel among frequency blocks dividing a system bandwidth in a manner so that the system bandwidth is divided into continuous sub-carrier frequency blocks,
a number and a location of the frequency blocks assigned to the paging channel are associated in advance, and
the paging indicator information receiving step includes receiving information indicating the number of frequency blocks assigned to the paging channel.

* * * * *